United States Patent [19]

Wendt

[11] Patent Number: 4,694,812
[45] Date of Patent: Sep. 22, 1987

[54] EXHAUST GAS RECIRCULATION VALVE HAVING INTEGRAL ELECTRONIC CONTROL

[75] Inventor: David L. Wendt, Janesville, Wis.

[73] Assignee: SSI Technologies, Inc., Janesville, Wis.

[21] Appl. No.: 853,964

[22] Filed: Apr. 21, 1986

[51] Int. Cl.⁴ ............................................ F02M 25/06
[52] U.S. Cl. .................................................... 123/571
[58] Field of Search ......................... 123/568, 569, 571

[56] References Cited

U.S. PATENT DOCUMENTS

| 4,378,776 | 4/1983 | Nishimori | 123/571 |
| 4,445,489 | 5/1984 | Kobayashi et al. | 123/571 |
| 4,454,853 | 6/1984 | Hasegawa | 123/571 |
| 4,454,854 | 6/1984 | Gotoh et al. | 123/571 |
| 4,455,987 | 6/1984 | Südbeck et al. | 123/571 X |
| 4,541,398 | 9/1985 | Kishi | 123/571 |

Primary Examiner—Willis R. Wolfe, Jr.
Attorney, Agent, or Firm—Learman & McCulloch

[57] ABSTRACT

An exhaust gas recirculating valve with vacuum motor actuator is integrally combined with an electronic control system having a valve position sensor and an electrically controlled pilot valve for the vacuum motor. The electronic control system responds directly to an externally generated low power voltage signal so that the voltage signal and the valve position are related in a monotonic manner. A signal circuit indicates when the exhaust gas recirculating valve is under command of the externally generated low power voltage signal.

9 Claims, 14 Drawing Figures

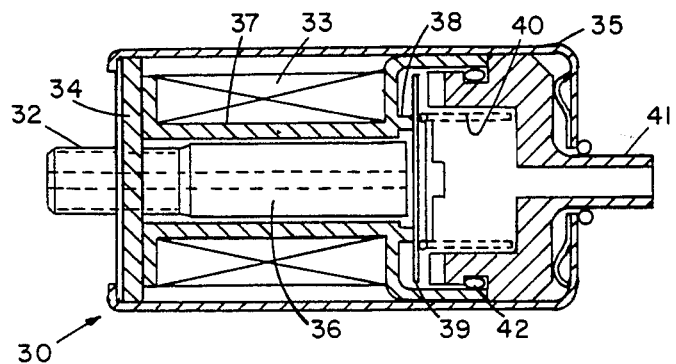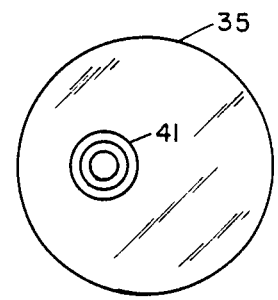
Fig.2a   Fig.2b
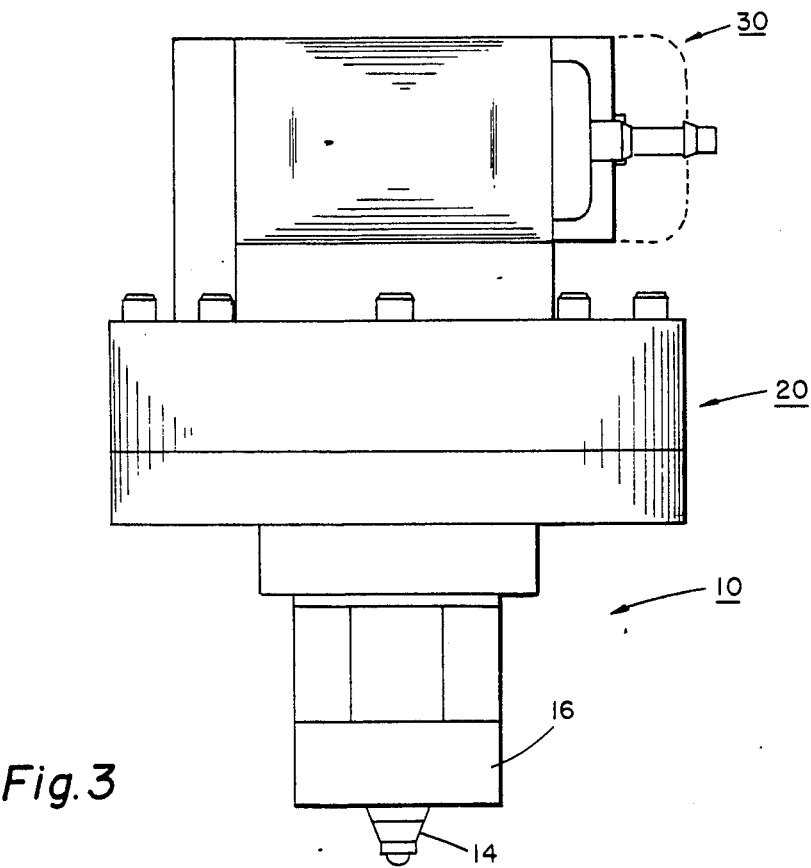
Fig.3

Fig. 5a
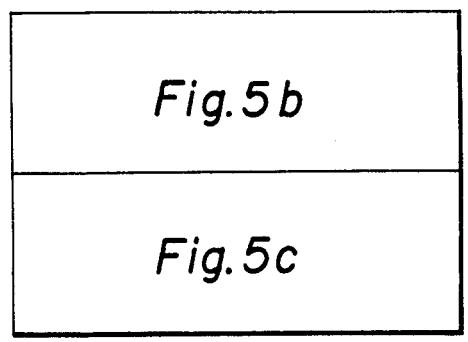
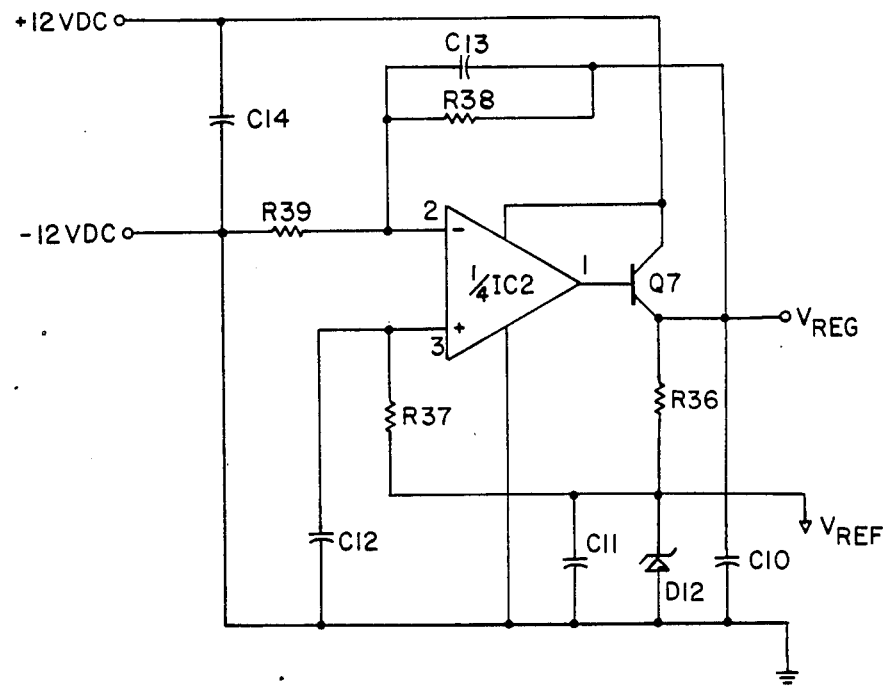
Fig. 5d

4,694,812

EXHAUST GAS RECIRCULATION VALVE HAVING INTEGRAL ELECTRONIC CONTROL

BACKGROUND OF THE INVENTION

This invention relates to an electronic exhaust gas recirculation system for use in connection with automotive vehicle engines.

SUMMARY OF THE INVENTION

In an automotive engine system meeting the current requirements for low emissions, the operation of the various engine functions, such as fuel injection, ignition timing, and exhaust gas recirculation is under the control of a remote on-board electronic engine control computer. For use in such a system the invention comprises an exhaust gas recirculation valve in which the amount of valve opening, as commanded by the on-board computer, is determined by an electronic control circuit integrally combined with such valve.

The electronic control circuit is directly actuated by the low-power binary duty cycle modulated signal which is received from the remote on-board engine control computer, and the resulting opening of the valve is a monotonic function of the modulation of the low-power binary duty cycle modulated signal.

The presence of alternating current components of the duty cycle modulated signal at the electromechanical drive of the exhaust gas recirculating means produces a mechanical vibration which effectively makes the valve friction-free. The absence of such components is used to indicate that the valve is not under control of the duty-modulated signal.

THE DRAWINGS

FIG. 2a is an enlarged sectional view of the electrically controlled pilot valve taken along the line 2—2 of FIG. 1;

FIG. 2b is an end elevational view of the device of FIG. 2a taken from the right side;

FIG. 3 is an elevational view of the exterior of the device of FIG. 1, taken from the left side thereof;

FIG. 5a is a diagram showing how FIGS. 5b and 5c should be arranged to form a circuit diagram of the electronic control circuit for the recirculating valve, as shown in FIGS. 5b and 5c, taken together;

FIG. 5d is a circuit diagram of part of the power supply for the electronic control circuit of FIGS. 5b and 5c;

Figure 5B:
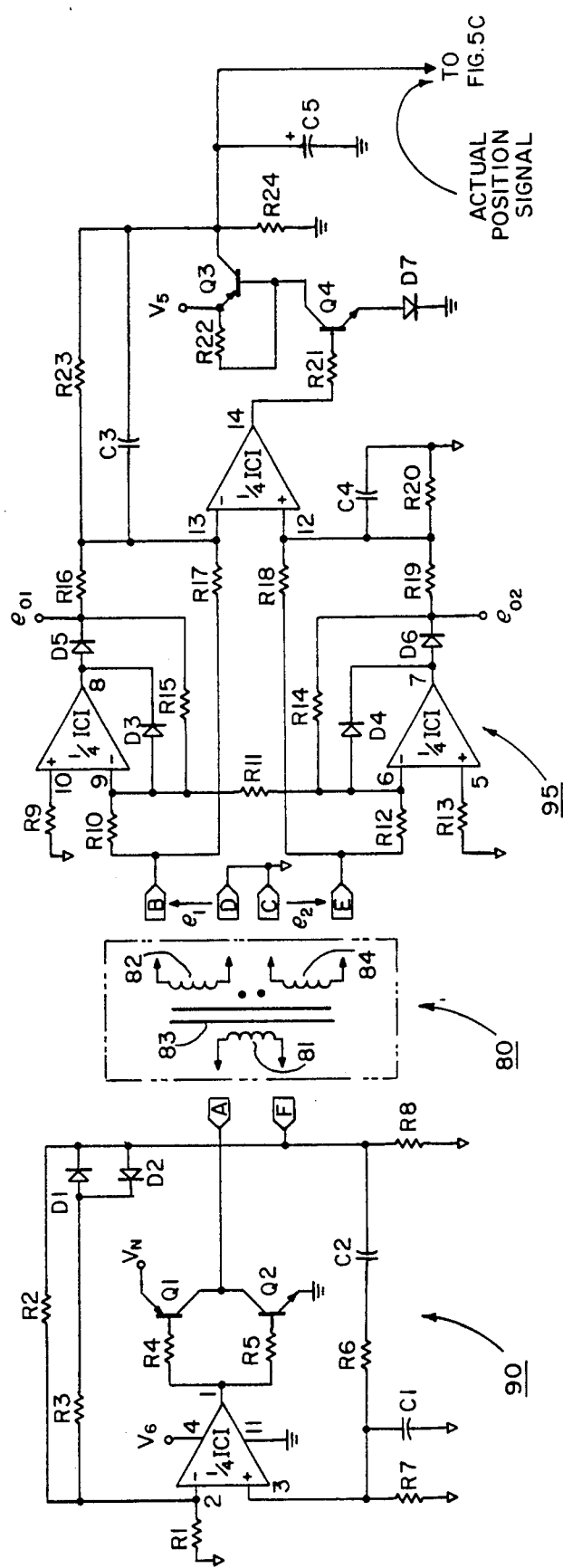
FIGS. 5b and 5c are circuit diagrams of separate portions which together form the electronic control circuit of the invention.
Figure 5C:
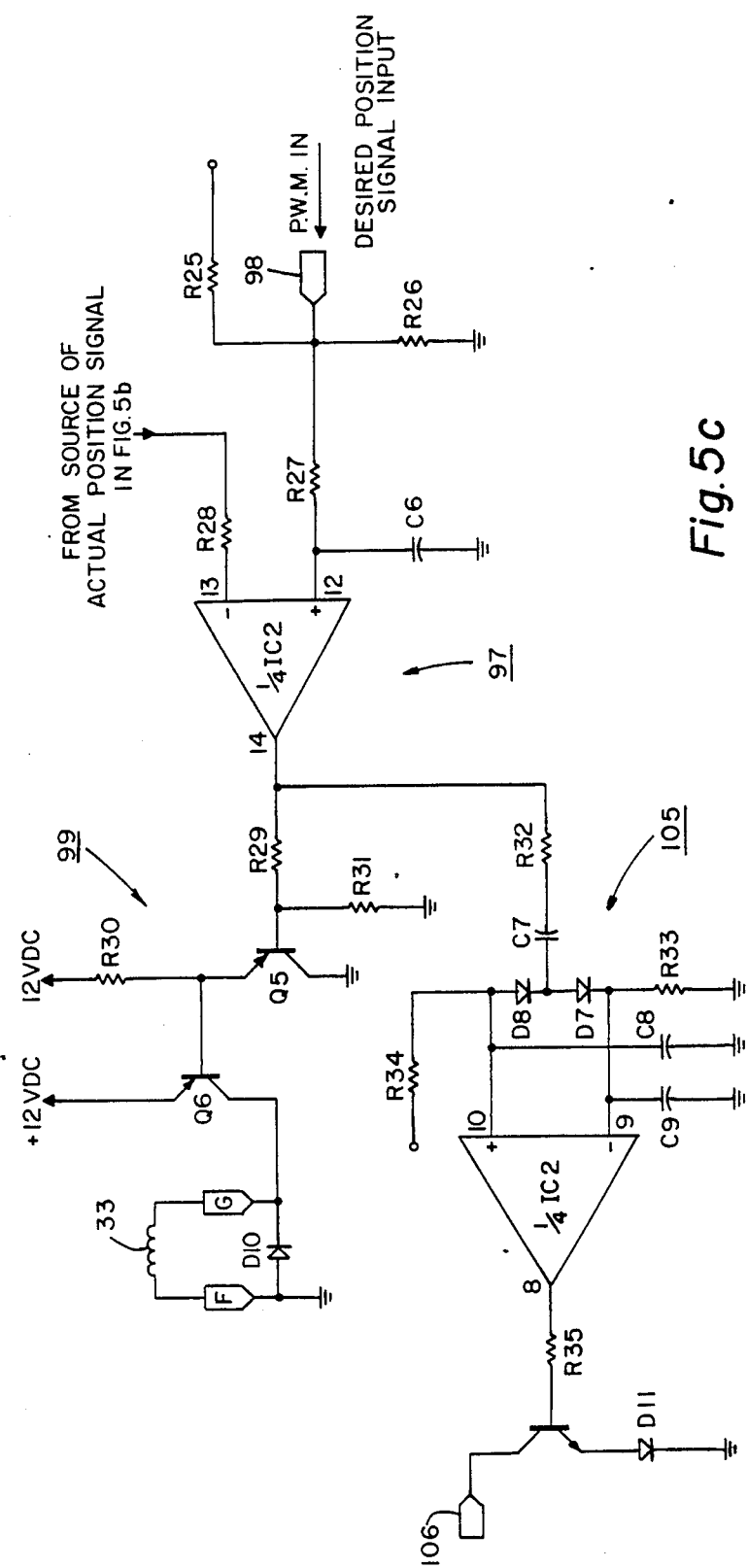
Figure 6A:
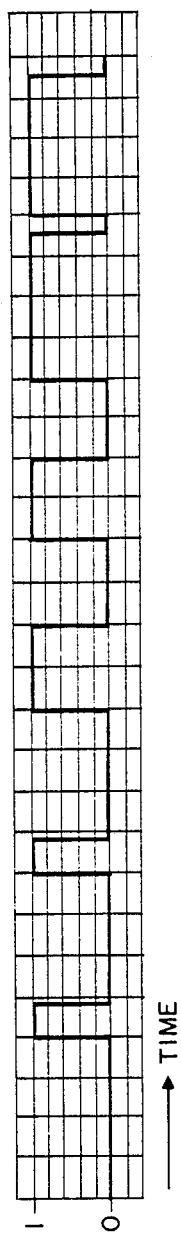
Figure 6B:
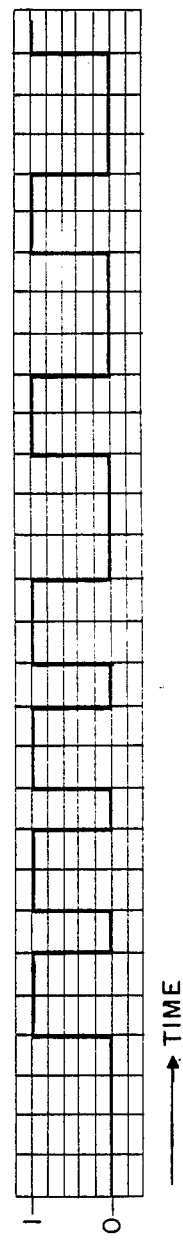
Figure 7A:
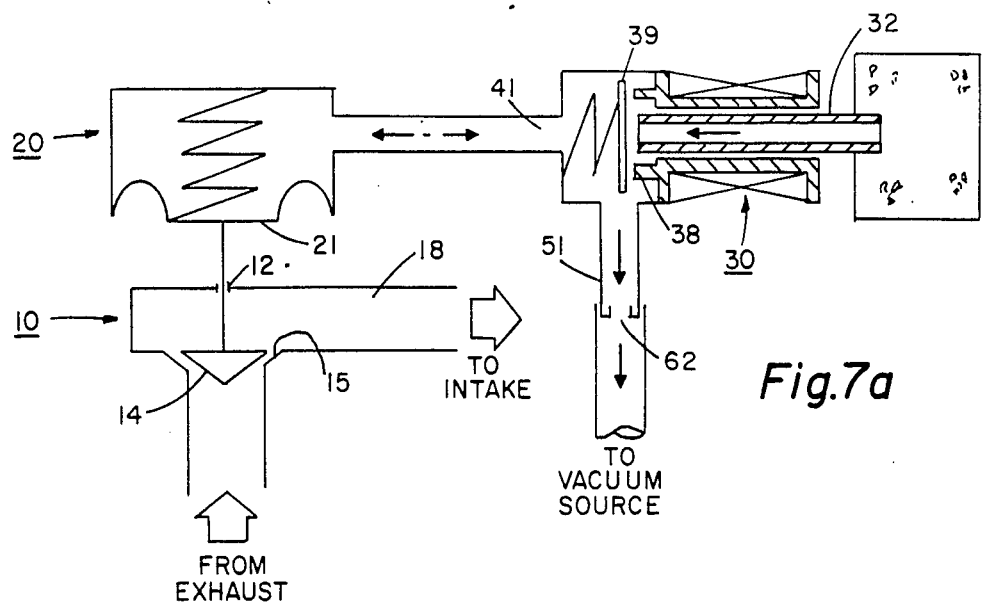
Figure 7B:
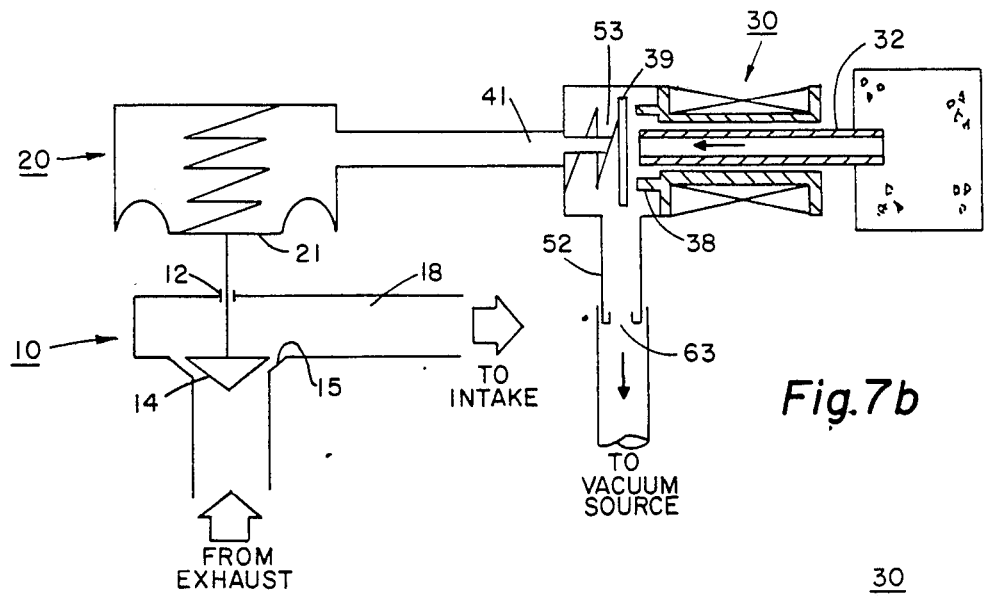
Figure 7C:
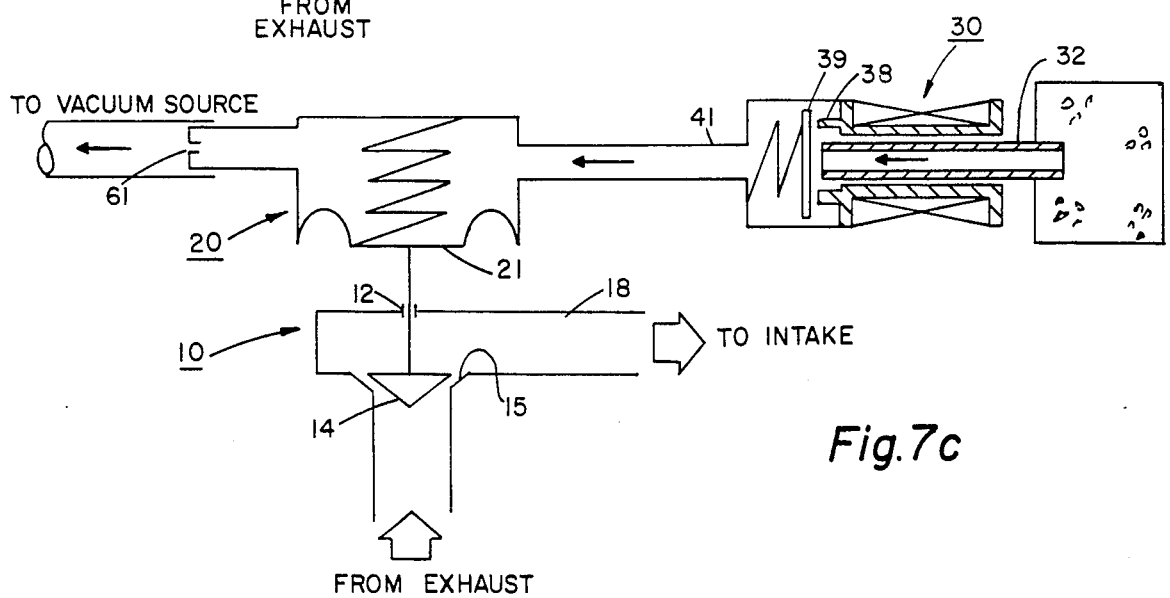

FIGS. 6a and 6b are diagrams showing two kinds of pulse width modulated signals such as are used to control the electronic control circuit of FIGS. 5b and 5c; and FIGS. 7a, 7b, and 7c are diagrams depicting three different ways in which the exhaust gas recirculating valve of this invention can be used with an engine.

DETAILED DESCRIPTION

When fuel is burned in an automotive internal combustion engine nitrous oxide is formed. The higher the temperature of the burn, the more nitrous oxide is formed. In order to meet the air pollution limits set by state and federal regulation, it is necessary to lower the temperature of the burn. This is done by recirculating some of the exhaust gas to the intake of the engine. The exhaust gas is low in oxygen and acts as a diluent for the unburned charge in the engine so that the temperature of the resulting burn is lowered. Necessarily, the driveability of the automobile would be impaired if a constant amount of exhaust gas were recirculated at all times. Therefore, exhaust gas is recirculated in varying amounts depending on factors such as whether greater or lesser power is called for by the vehicle operator, the speed of the engine, the engine temperature, and the flow of air and fuel through the engine. In the prior art, these factors are sensed electrically and fed to an on-board computer called an electronic engine control module to produce an output signal which commands an appropriate flow of exhaust gas recirculation.

The exhaust gas recirculating valve according to the invention responds directly to the low power computer output signal of such an on-board computer. This is done by integrally combining in one unit the exhaust gas recirculating valve, a linear displacement vacuum motor to adjust the valve, a linear voltage-displacement transducer which senses the position of the valve, and a proportional balancing system which compares the position of the valve with the position commanded by the on-board computer so as to develop a difference signal which controls the pilot valve of the linear displacement vacuum motor.

Figure 1:
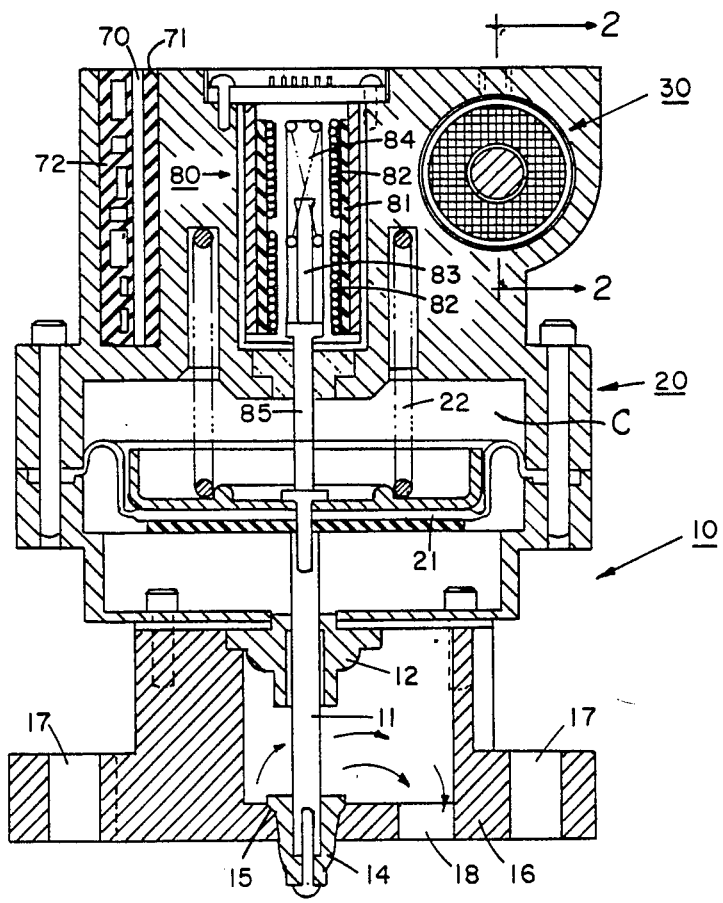
FIG. 1 is a vertical sectional diagram of the complete exhaust gas recirculation valve constructed according to the invention and ready for installation on an engine.

FIG. 1 illustrates an exhaust gas valve 10 within which is a vertically adjustable spindle 11 slideable in a bored guide 12 and which carries at its lower end a tapered pintle 14 that closes a valve seat 15 when the spindle 11 is in one position. When the position of the spindle 11 is adjusted or raised the tapered pintle 14 lifts off the valve seat 15, thereby enabling exhaust gas to pass around the pintle and into the engine intake through passage 18.

The valve 10 includes casing 16 bolted onto the engine manifold, using the bolt holes 17, and the gas-tightness of the connections to the intake and exhaust chambers of the manifold are ensured by the use of a gasket and proper seating of the bolts, as is customary. The bore of the guide 12 is enlarged at its lower portion to provide a clearance that prevents sticking of the spindle by deposits which accumulate during use of the apparatus.

The position of the spindle 11 is adjusted by means of a vacuum powered motor hereinafter referred to as a vacuum linear actuator 20. The actuator 20 includes a diaphragm assembly 21 in the casing which defines a variable volume chamber C. The diaphragm assembly may be raised (as viewed in FIG. 1) against the force of a spring 22 by the difference between ambient air pressure below the diaphragm assembly 21, which is open to atmosphere, and subatmospheric pressure in the chamber C above the diaphragm assembly 21.

The pressure in the compartment C of vacuum linear activator 20 is controlled by a pilot valve 30 shown in detail in FIG. 2a. A nipple 32 is connected by a hose, not shown, to receive relatively high pressure ambient air from any clean source, such as the output of the engine air filter.

The nipple 32 is made of magnetically permeable material which does not retain any permanent magnetization when an electromagnetic coil 33 is energized and then deenergized. A disk 34 formed of magnetically permeable material, such as ferritic stainless steel and a magnetically permeable steel can 35 form a magnetic circuit for the coil 33. The end of the nipple 32 which extends inwardly forms a magnetic pole 36. The hollow magnetic pole 36 is adjustable in the bore of the bobbin 37 on which the coil 33 is wound to permit the gap between the pole 36 and the magnetically permeable flow control disk 39 to be set to optimum during manufacture and initial calibration. Thereafter the position of the pole 36 remains fixed. The bobbin 37 has a protruding cylindrical lip 38 against which the flow control disk 39 is pressed by a spring 40.

When the coil 33 is energized the magnetic pole 36 attracts the control disk 39 and seats it more firmly on the lip 38 than the force of spring 40 does alone. The pilot valve 30 is in pneumatic communication with a relatively low pressure or vacuum source via a nipple 41 projecting outwardly of the can 35 and in communication with the chamber C. The nipple 32 is in pneumatic communication with atmosphere via an air filter. Thus, when the coil 33 is not energized, atmospheric pressure at the nipple 32 unseats the flow control disk 39, against the force of the spring 40, permitting a continuous leakage of air from the nipple 32 to the nipple 41. When the coil 33 is energized air cannot flow through the can 35 from the nipple 32 to the nipple 41 because the flow control disk 39 is in sealing contact with the protruding lip 38 and because an O-ring seal 42 blocks a sneak path through the space between the coil 33 and the can 35.

The pilot valve 30 can control the pressure in the compartment C of the vacuum linear actuator 20 in several ways, three of which are illustrated in FIGS. 7a, 7b, and 7c. The specific construction of FIG. 2a is used in the preferred embodiment of FIG. 7c. The embodiments of FIGS. 7a and 7b have pilot valves which are slightly modified from that of FIG. 2a in that they have side branches 51 and 52, respectively. Furthermore, the nipple 41 of the embodiment of FIG. 7b also has an extension 53 which can be sealed by the movement of the disk 39 to the left, at the same time that the protruding lip 38 is unsealed by such movement.

The embodiment of FIG. 7c can be referred to as a "flow-through" type since ambient air may flow from the filter 45 into the nipple 32, through the pilot valve 30, out the nipple 41, through the contractable chamber of the vacuum linear actuator 20, and through a flow restricting orifice 61 to the source of vacuum. The amount of air which leaks through the orifice 61 to the vacuum source, in comparison with the amount of ambient air passed by the pilot valve 30, determines the pressure of the partial vacuum in the vacuum linear actuator 20, the position of the diaphragm, and the position of the valve pintle 14.

The main advantage of the "flow-through" system of FIG. 7c is that filtered air constantly sweeps out the contaminants, such as oil and gasoline fumes, from the chamber C of the vacuum linear actuator 20. Furthermore, it does not require the establishment of a branch connection such as 51 or 52 (FIGS. 7a and 7b) on the pilot valve 30.

The type of pneumatic control shown in the schematic of FIG. 7a is similar to, but specifically different from the "flow through" type, except that the orifice 62, which corresponds to the orifice 61 of FIG. 7c, is in a side branch 51. This embodiment requires the vacuum linear actuator to have only a single pneumatic connection to it, rather than two, as in FIG. 7c.

The embodiment of FIG. 7b also is similar to that of FIG. 7a except that there is an additional valve seat 53 in the pneumatic control. The extra valve seat allows the pressure of the inrush of atmospheric air to seal momentarily the disk 39 against it. It also has less flow through the filter which lengthens its life and tends to be quieter in operation.

Figure 4:
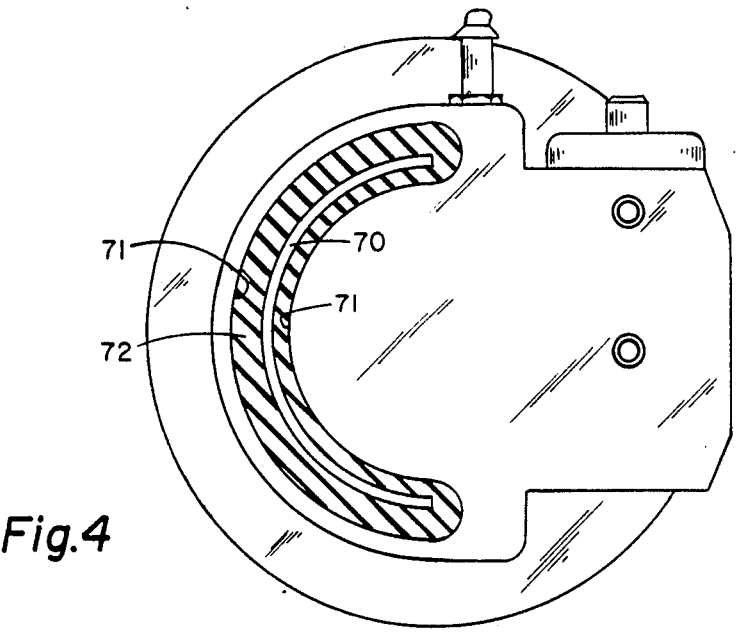
FIG. 4 is a top plan view of the device of FIG. 1.

The coil 33 of the pilot valve 30 is connected to and energized by circuitry carried by a circuit board 70 (FIGS. 1 and 4) in the form of a semicylinder fitted in a semicircular slot 71. The circuit board 70 is held in place and protected by a rigid potting compound 72. The circuit components on the circuit board 71 are described below.

A linear voltage-displacement transducer 80 comprises a primary coil 81 and two axially spaced secondary coils 82, all wound about a common axis along which a magnetic core 83 is slideable. The magnetic core 83 is biased in one direction by a compression spring 84, but kept at a constant distance from the diaphragm assembly 21 by means of an interposed nonmagnetic rod 85. Thus, as the diaphragm assembly 21 moves to adjust the pintle 14, the magnetic core 83 moves in the same manner. This movement increases the inductive coupling between the primary coil 81 and one of the two secondary coils 82 while simultaneously decreasing the inductive coupling between the primary coil 81 and the other one of the two secondary coils 82. As explained below, a constant frequency sine wave of constant amplitude is fed to the primary coil 81, so that the two secondary coils 82 produce alternating current outputs which vary oppositely in amplitude. The result is a push-pull action producing two outputs which, when properly combined, furnish a single output voltage that varies very nearly in a linear manner with the movement of pintle 14. Linearity leads to greater accuracy in measurement and control.

The circuitry carried by the circuit board 70 is shown in FIGS. 5a through 5d.

FIG. 5b discloses a Wein bridge oscillator 90 supplied at pin 4 with a regulated voltage $V_s$ (for example, regulated +10 voltage DC) with respect to chassis ground. A positive feedback circuit R6, C2, R7, C1 produces oscillations at a constant frequency of about 3600 Hz. A negative feedback circuit from pin 1 to pin 2 includes a limiter circuit D1, D2, R2, R3 which causes the oscillations to be constant in amplitude and to be of sine wave shape.

The constant AC output of the Wein bridge oscillator 90 is supplied to the primary coil 81 of the linear voltage-displacement transducer 80. Reciprocating movement of the magnetic core 83 in response to adjustment of the exhaust gas recirculation valve pintle 14 changes the mutual coupling between the primary coil 81 and the upper secondary coil 82 in a direction which is opposite to the concomitant change in the mutual coupling between the primary coil 81 and the lower secondary coil 82. Thus, when one of the alternating current output voltages $e_1$ or $e_2$ of FIG. 5b increases in amplitude the other one decreases. The two voltages $e_1$ and $e_2$ are essentially in push-pull relationship, but will have a small common mode component.

The information carried by modulated voltages $e_1$ and $e_2$ is demodulated, amplified, and low-pass filtered in a demodulator-amplifier 95. The demodulator comprises two active rectifiers. For example, one rectifier includes the upper operational amplifier whose output pin 8 passes positive going pulses through diode D5 to pin 13 of a differential operational amplifier and which passes negative going pulses through diode D3 back to inverting input pin 9 of the upper operational amplifier. The outputs of the two operational amplifiers are cross coupled through resistor R11 to suppress the small common-mode component in the signals $e_1$ and $e_2$. The outputs of the upper and lower operational amplifier are subtracted from each other at pins 13 and 12 of the differential operational amplifier and the difference, a linear measure of the position of the core 63, is power amplified in $Q_3$ and $Q_4$. Resistor R23 and capacitor C3 provide a frequency dependent negative feedback from the output of $Q_3$ to the inverting input pin 13 of the differential operational amplifier. The circuit just described acts as a low pass filter, having a cut off of about 20 Hz.

In the circuit of FIG. 5b the pins 10 and 5 of the operational amplifiers of FIG. 5b are referenced to voltage $V_{REF}$, which is approximately half of the regulated voltage $V_s$. These voltages are derived from the voltage supply circuit of FIG. 5d, the circuitry of which is located on the same circuit board 70 as is the circuitry of FIGS. 5b and 5c. Since $V_{REF}$ is about 5 volts and $V_s$ about 10 volts, the demodulating operational amplifiers operate in a current source manner with an undistorted output swing between 0.3 and 4.5 volts, even through the power supply for the integrated circuit chips is between $V_s$, the regulated voltage of about 10 volts, and ground. This improves the linearity of measurement. The use of PNP and NPN transistors $Q_3$ and $Q_4$, coupled in series between $V_s$ and ground, is a further feature improving linearity.

The output of $Q_3$ is a variable DC voltage which is a linear measure of the position of the core 83 of FIG. 1. This variable voltage will be referred to as the "actual position signal" (APS) since it signals the actual position of the magnetic core 83, and hence the position of the valve pintle 14 and the extent to which exhaust gas is enabled to flow through the passage 18. Another voltage, received from the on-board electronic engine computer module, will be referred to as the "desired position signal" (DPS) since it is the voltage which commands a particular opening-closing state for the pintle 14 of valve 10.

Although the APS is derived from the differences in the voltages $e_1$ and $e_2$, which are at a carrier frequency of about 3600 Hz, the APS, obtained after demodulation and low pass filtering, is essentially a smoothly varying direct current signal which varies exactly with the amount and rate of movement of the pintle 14.

The APS is forwarded by the downgoing conductor at the extreme right of FIG. 5b to the circuit shown in FIG. 5c through resistor R28 to pin 13 of an operational differential amplifier 97. Meanwhile, the DPS, received at a spade terminal 98, is applied through resistor 27 to the inverting pin 12 of that amplifier. The difference between these two signals appears at output pin 14. It is called an error signal in the terminology of control system technology. It is power amplified in $Q_5$ and $Q_6$ and passes through solenoid winding 33 of pilot valve 30 to ground. The direction in which the pilot valve is operated, i.e., whether it is opened or closed, depends upon the sign of the error signal at pin 14. Furthermore, the error signal will be large even when the difference between the DPS and the APS is small. Thus, the tendency of the system, described so far, is to make a massive correction. This might, in other situations, lead to instabilities, but they do not occur in the described system because of the nature of the DPS.

The DPS which is applied to pin 12 of the differential amplifier 97, unlike the smoothly varying APS, is a binary duty cycle modulated signal which is supplied by the on-board electronic engine control module. This module produces a binary low powered signal of the same character as that used for communication between computers That is, the signal is alternately at a fixed higher voltage and at a fixed lower voltage, with abrupt transitions between the higher and lower states, respectively referred to as on and off.

Two varieties of this type of signal, suitable for transmitting the DPS to the electronic circuit disclosed herein, are reproduced in FIGS. 6a and 6b.

In FIG. 6a, the signal rises from the lower or off state to the higher or on state at the passing of each successive constant interval of time. Thus, the rise of the signal is also synchronous with the beginning of each successive interval. The fall from the on state to the off state varies with time to produce pulses of variable length. The ratio of the length of the on pulse to the length of the interval, referred to as the duty cycle, is an indication of the information transmitted from the remote on-board electronic engine control computer to the exhaust gas recirculating valve. The six on pulses of FIG. 6a have successive duty cycles, reading from the left, of 20%, 20%, 50%, 50%, 90%, and 90%.

In FIG. 6b the on pulses are always of constant length, but the spacing between them, and hence their frequency, is varied to achieve a variable duty cycle. The duty cycle in this instance is measured in terms of the ratio of off time to the sum of off and on time. The six on pulses of FIG. 6b have successive duty cycles, reading from the left, of 33%, 33%, 33%, 60%, 60%, and 60%.

These types of pulse-modulated signals are being used more frequently in computer control techniques. The simple on/off signal is ideally suited for digital electronic use. Some vehicles, such as those produced by Chrysler Corporation and General Motors Corporation typically use the duty cycle shown in FIG. 6a, which is the most commmon, whereas vehicles manufactured by Ford Motor Company use the type illustrated in FIG. 6b.

The lower power output at pin 14 of the differential amplifier 97 is amplified in power amplifier 99 and the amplified output passes through the winding 33 of the pilot valve 30. Since the differential amplifier 97 has a very high amplification factor, and since the duty cycle modulated pulse input at pin 12 has a period of about 1/80 second, the output at pin 14 has a very jagged wave form having a fundamental repetition rate of about 1/80 second. This very jagged wave form will alternately drive transistor $Q_6$ to complete conduction and to complete cut-off. Since the solenoid winding 33 has inductance, and the current in it resists change, a diode D10 is provided to permit the solenoid current to continue to flow when transistor $Q_6$ is off.

The core 36 of pilot valve 30 obviously cannot follow the very rapid changes in the solenoid winding 33, but will have a vibration at 80 Hz in addition to having a movement to open or close the pilot valve. This vibration is important in the action of the pilot valve, since it overcomes the effect of friction. The flow control disk 39 will not stick and the pilot valve 30 will operate without hysteresis. However, the vibration could be too severe, resulting in excess wear. To control the amount of vibration, the values of the capacitor 66 and resistor R27 at pin 12 of the differential amplifier 97 are chosen to provide an appropriate amount of low pass filtering of the pulse wave signal to provide an appropriate amount of vibration. Such an amount of low pass filtering will not affect the action of the circuit, which is a proportional balancing system. The position of the flow control disk 39 in the pilot valve 30 will be determined by the geometry of the device, the average current in solenoid winding 33 (that is, the direct current component of the current in the solenoid winding 33), and by the strength of spring 40. That position will be subjected to a small amount of vibration at 80 Hz, the amount being determined by the alternating current components of the current through solenoid winding 33, as determined by the circuit parameters, and especially by R27 and C6 at pin 12 of the differential amplifier 97.

The output of differential amplifier 97 is also applied to the sense amplifier 105, which serves to signal back to the on-board electronic engine control computer whether or not the exhaust gas valve 10 is operative. When the valve is not operative the output of the differential amplifier 97, because of the high gain of the differential amplifier, will be either a constant high voltage or a constant low voltage. But when the exhaust valve 10 is operative, the output of the differential amplifier 97 is a pulse wave having a repetition rate of about 80 Hz.

The differential amplifier 97 is connected to the sense amplifier 105 by a circuit which includes capacitor C7, so that no direct current component can pass.

When pulses are present, they cause diodes D8 and D9 to deliver positive charges from pin 10 to pin 9, driving pin 10 negatively and pin 9 positively. The operational amplifier accordingly produces a negative going signal at pin 8, cutting off conduction in the transistor, and open circuiting the output spade terminal 106, which is connected by a harness to the on-board electronic engine control computer.

When pulses are absent, the diodes D8 and D9 no longer act to deliver charges from pin 10 to pin 9. Instead, regulated positive voltage is applied through resistor R34 to pin 10 of the operational amplifier, driving pin 8 positively, and thereby saturating the transistor. The result is that spade terminal 106 is no longer open circuited but is effectively clamped to ground potential plus the negligible voltage drop through diode D11 and the heavily forward biased base-emitter junction of the transistor. The grounding of spade terminal 106 signals that the exhaust gas valve 10 is no longer operative.

The herein disclosed design is significantly different from known prior art designs by virtue, inter alia, of the integral packaging of an electronic control into the valve. Besides electrical power at 12 volts from the vehicle battery and vacuum power from the engine manifold, only a low power voltage signal is needed to control the amount of exhaust gas flow through the valve. Thus, no high current drive signal is needed from the on-board electronic engine control computer. The relationship between the amplitude modulation of the low power signal and the amount of recirculation flow is nearly linear, so that the algorithm for generating the low power signal at the electronic engine control is simple.

The disclosed embodiment is representative of a presently preferred form of the invention, but is intended to be illustrative rather than definitive thereof. The invention is defined in the claims.

I claim:

1. Exhaust gas recirculating apparatus for delivering a variable quantity of exhaust gas from an engine exhaust to its air intake, said apparatus comprising a casing having therein a subatmospheric pressure chamber in communication with a source of relatively low air pressure; passage means through which exhaust gas may flow; valve means movable between positions in which the flow of said exhaust gas through said passage is enabled and disabled; adjusting means coupled to said valve means for adjusting the position of the latter in response to pressure changes in said chamber; constant restriction means interposes between said chamber and said source and in communication with each for permitting a continual leak of air from said chamber to said source; pilot valve means interposed between said chamber and a source of ambient air at atmospheric pressure; adjustable flow control means in said pilot valve means for varying the quantity of air that may pass through said pilot valve; and operating means coupled to said flow control means and responsive to electrical control signals to adjust said flow control means.

2. Apparatus according to claim 1 wherein said pilot valve means communicates with said source via said chamber.

3. Apparatus according to claim 1 wherein said flow control means comprises a seal movable between positions in which the flow of air through said pilot valve is enabled and disabled.

4. Apparatus according to claim 3 wherein said flow control means includes a solenoid having a movable flow control disk operable to effect movements of said seal between said positions.

5. Exhaust gas recirculating apparatus for use with an internal combustion engine comprising valve means; movable adjusting means for moving said valve means between open and closed conditions; drive means for moving said adjusting means; sensing means for detecting the condition of said valve means and for producing a measurement signal to indicate the actual position of said valve means; means for receiving a command signal originating from a source of electrical energy, said command signal indicating the desired position of said valve; means for comparing said measurement signal and said command signal to produce a difference signal; and amplifying means utilizing said difference signal to cause said drive means to move said adjusting means in such sense as to reduce the magnitude of said difference signal; said drive means comprising a vacuum powered motor having a variable size chamber, in which the vacuum in the chamber is controlled by pilot valve means responsive to said difference signal; means for continuously leaking vacuum through a restriction into said chamber; said pilot valve means selectively propagating ambient atmospheric-pressure air into said chamber under the control of said difference signal, to thereby control the magnitude of the resulting vacuum in said variable size chamber.

6. Apparatus according to claim 5 in which said pilot valve means comprises solenoid means energized by the difference signal to magnetically attract a moveable magnetic closure to seat upon an aperture, said closure when seated on said aperture preventing ambient air propagation through said aperture to said variable size chamber.

7. Apparatus according to claim 5 including means to cause said difference signal to have a constant alternating current component, whereby said solenoid means causes said flow control means to vibrate.

8. Apparatus according to claim 7 wherein the command signal is a duty cycle modulated pulse wave, and wherein the constant alternating current component is derived from the pulses of the command signal.

9. Apparatus according to claim 7 including signal circuit means for signaling whether or not said valve means is operative, said signal circuit means being responsive to the presence or absence of the constant alternating current in said difference signal.

* * * * *